March 23, 1926.  1,577,703
J. H. FEDELER
METHOD OF CLEANING AND CHARGING AIR FILTERS
Filed Oct. 17, 1925
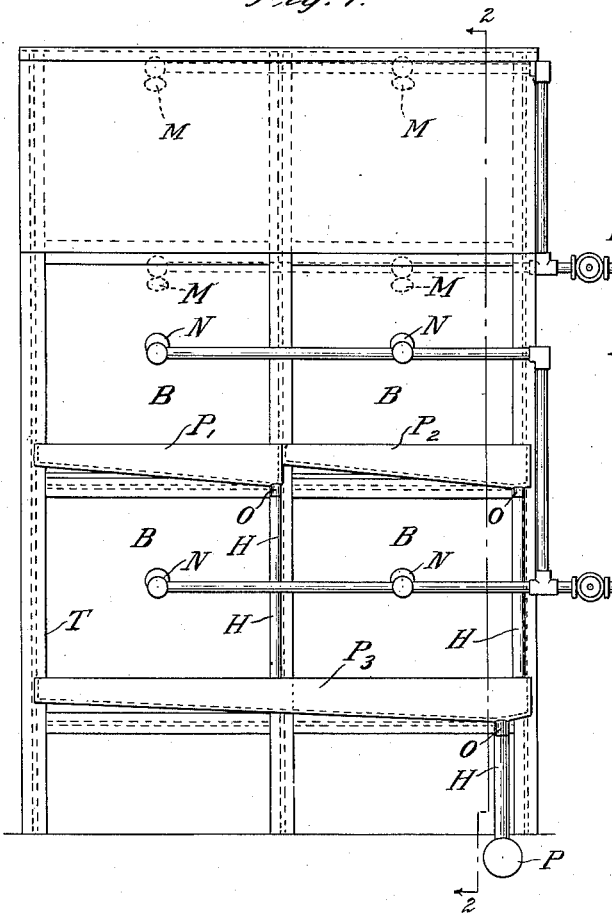
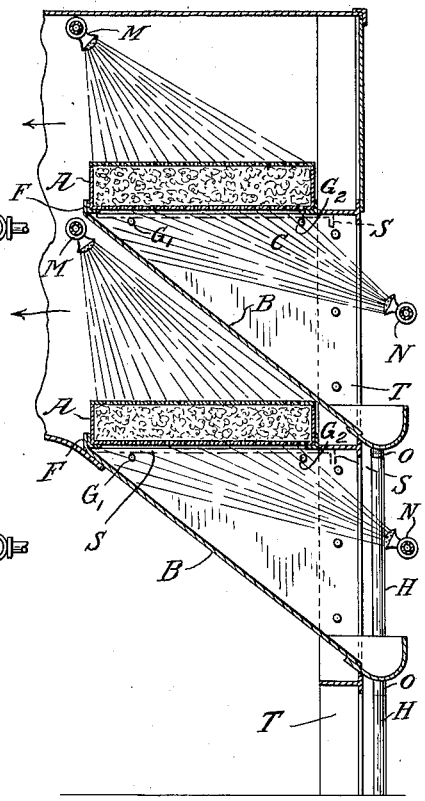
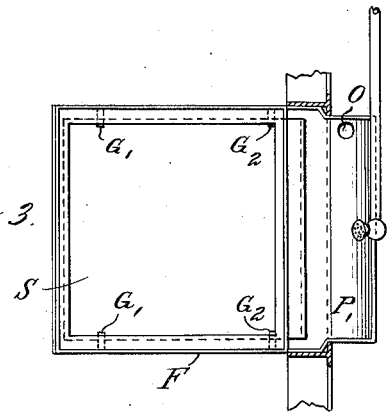
INVENTOR.
John H. Fedeler,
BY
ATTORNEY.

Patented Mar. 23, 1926.

1,577,703

UNITED STATES PATENT OFFICE.

JOHN H. FEDELER, OF NEW YORK, N. Y.

METHOD OF CLEANING AND CHARGING AIR FILTERS.

Application filed October 17, 1925. Serial No. 63,201.

*To all whom it may concern:*

Be it known that I, JOHN H. FEDELER, citizen of the United States, and resident of New York, in the county and State of New York, have invented certain new and useful Methods of Cleaning and Charging Air Filters, of which the following is a specification.

My invention refers to an improvement in methods of cleaning and charging air filter mediums, such as are mounted on a frame and are taken down and washed in water and then charged by dipping them in a viscous or jelly like material.

The object of my invention is a method of cleaning and charging the filter mediums by which the labor of moving the same for this purpose is eliminated.

All air filters of the type in which the filter medium is supported in a frame work and which the medium is taken out and first washed by dipping the same in a tank of water and then in a tank of viscous material, can be altered so that my washing process can be employed.

It consists substantially in altering the vertical air filters now in common use by first removing the filter medium and replacing it with an elbow of sheet metal terminating in a drainage pan in its lower end, and being provided with a frame in its upper end, into which the filter medium fits and is replaced. The process of washing the filter mediums is accomplished by water of a suitable temperature, which is sprayed on the filter mediums by a hose or nozzle held or placed above and below the filter mediums and the charging is done likewise with a suitable viscous material. In the event that the residue of the air requires a special solvent and it is desirable to reach parts of the filter medium which running water cannot wash, then a sheet of metal is inserted under the filter medium so it can be filled with hot water and soda or other solvents, and which can be reclaimed by placing a stopper into the drain of the drainage pan, into which it runs by gravity, when the sheet of metal under the filter medium is removed.

This new process of cleaning filter mediums requires certain means and devices which may be varied. One suitable form is shown in the apparatus illustrated in the accompanying drawing in which Fig. 1 is a front elevation. Fig. 2 is a vertical section on line 2—2 of Fig. 1. Fig. 3 is a top view of one of the upper elbows attached to the frame.

The nature and operation of the apparatus are as follows:—

My process of cleaning and charging is adaptable in types of filters in which a number of filter mediums are supported in a frame work and in which all the filter mediums usually are alike, and are usually built in at the intake of the blower which draws or forces the air through the filter mediums. In order to employ my process of cleaning and charging the filter mediums, certain alterations are required which are similar for each filter medium.

Elbow B is a metal enclosure provided with a frame F into which the filter mediums A fit, and the other end of which is secured to the frame work T, on the sides and top, and the lower end of which terminate into pans $P^1$, $P^2$ and $P^3$. Each pan has a drain O, towards which the bottom of the pan slopes and each drain O is provided with a rubber hose H, secured thereto, and with its lower end free to either drain the contents of the pan it is attached to into a lower pan, or a sewerage system P, as shown, or into a bucket into which the hose can be directed when the content of the pan is reclaimed to be used over again.

Each filter medium can furthermore be provided with means for holding water or a solvent and which can be run off and reclaimed if desired. I accomplished this by clamping a plate to the lower part of filter medium or providing pegs $G^1$ or $G^2$ on each side of elbow B, and sliding a metal slide S under the filter medium so that it may be filled with a solvent, which is drawn off by removing slide.

Under normal conditions my process consists of alternately spraying the upper and lower sides of the filter mediums with hot water, and then likewise spraying the viscous material. For this purpose nozzles M and N may be secured to the frame work of the filter and connected with the source of the materials required.

The charging of the filter mediums A can also be accomplished by atomizing the viscous solution while the filter is in operation.

By covering the inside of elbow B with this viscous solution, a longer time between each cleaning is gained because many impurities are caught in the elbow itself, due to the change of direction of the air.

Any liquid sprayed onto the filter mediums A in sufficient quantity flows into elbow B down to pans $P^1$, $P^2$ and $P^3$, and finally into sewer P. Should it, however, be desirable to reclaim or use the washing liquid over again, it would be necessary to put a plug into outlet O of the particular pan into which the elbow B terminates, and which supports the filter medium being washed. The hose leading from the aforesaid outlet O is then held over a bucket and the plug removed allowing the liquid to flow into the bucket. This liquid may then be used over as often as desired.

What I claim as my invention is:

1. The process of washing and charging air filter mediums by alternately subjecting the top and bottom of the same to a spray of water and then to a spray of viscous material.

2. The process as described of washing the filter mediums of an air filter and then spraying the same with viscous material without removing the filter mediums.

Signed at New York in the county of and State of New York this 7th day of October A. D. 1925.

JOHN H. FEDELER.